March 24, 1964     P. C. MOONEY     3,126,187
CAMERA TIGHTENING ARRANGEMENT FOR TRIPODS
Filed April 28, 1961
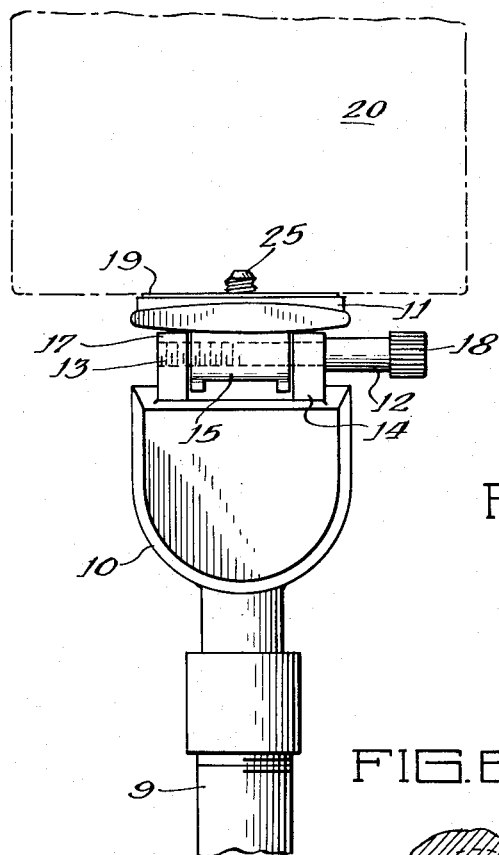
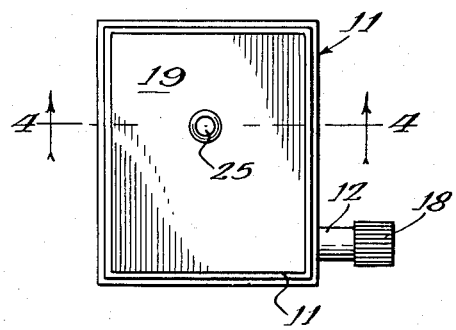
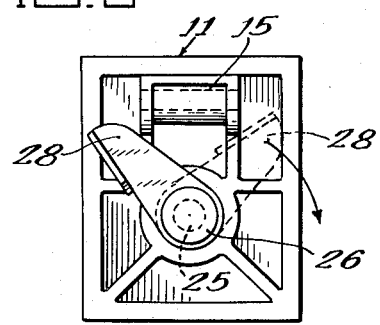
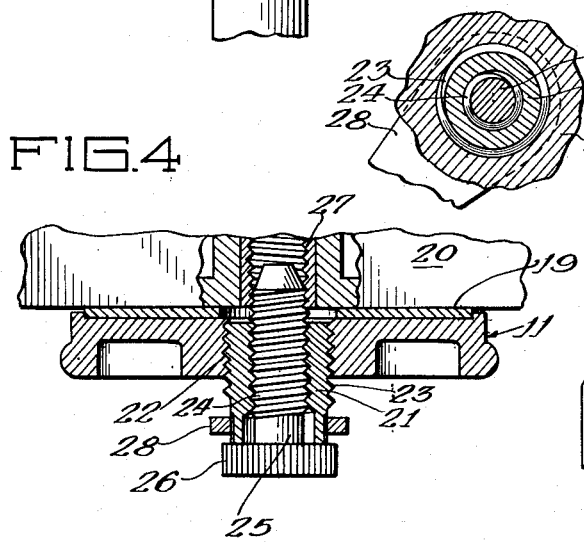
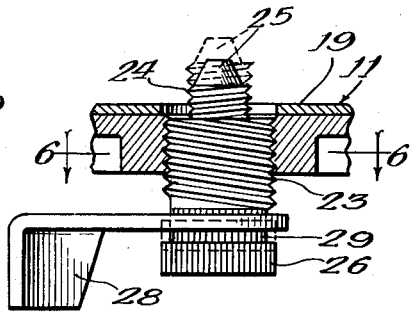
Inventor:
Paul C. Mooney
By: Hofgren, Brady, Wegner,
Allen & Stellman
Attorneys United States Patent Office 3,126,187
Patented Mar. 24, 1964

3,126,187
CAMERA TIGHTENING ARRANGEMENT
FOR TRIPODS
Paul C. Mooney, Northbrook, Ill., assignor to Quick-Set, Incorporated, a corporation of Illinois
Filed Apr. 28, 1961, Ser. No. 106,341
5 Claims. (Cl. 248—187)

This invention relates to a device for tightly securing a camera to a supporting base plate, and more particularly, to a structure including a manually actuated lever operable to frictionally lock a camera to a camera tripod supporting base plate with a few degrees of movement of the lever after initial screw attachment of the camera to the tripod in the usual manner.

The tripod is an essential piece of photographic equipment to many photographers. A tripod support is used in many photographic endeavors and is a particularly useful aid when the photographer wants to make sure that the camera does not move accidentally or undesirably during the taking of a picture. When used with a tripod, a camera should be tightly secured to the tripod supporting base plate. This assures the photographer that the picture that he sights through the camera viewer is the actual picture taken by the camera. In still camera work, the camera should not move out of alignment in the interval between positioning the camera and the actual taking of the picture. The arrangement of the present invention holds the camera tightly so as to avoid any blurring of the picture due to camera movement when the shutter is snapped and also prevents any accidental loosening of the camera to tripod connection.

The device of this invention contains a screw arrangement which is manually turned to draw the screw and the camera to which it is attached, toward the base plate of the camera tripod. The screw arrangement may be used in a tripod camera mounting plate wherein the screw and a supporting bushing are carried directly by the plate or the screw and the camera may be mounted in any other type of camera supporting plate including those of the movable or adjustable types.

The primary object of the present invention is to provide a new and improved device for tightly securing a camera to a camera tripod supporting base plate.

Another object is to provide an inexpensive mechanical means for frictionally locking a camera onto a supporting tripod.

A further object is to provide a simple screw arrangement which may under all conditions of operation cause a camera to become locked with respect to a supporting tripod.

The invention is illustrated in a preferred embodiment in the accompanying drawings, in which:

FIGURE 1 is a fragmentary side elevational view of the upper portion of a camera supporting tripod illustrating the tightening device of this invention and showing a camera in dotted outline secured tightly to the base plate of the supporting tripod;

FIGURE 2 is a top plan view of the base plate of the tripod without a camera thereon;

FIGURE 3 is a bottom plan view of the base plate shown in FIGURES 1 and 2;

FIGURE 4 is an enlarged fragmentary sectional view taken substantially as indicated on line 4—4 of FIGURE 2 and further showing a camera and the base plate in locked relation;

FIGURE 5 is an enlarged fragmentary sectional view showing the bushing, screw and manual lever arrangement in full and dotted line positions; and FIGURE 6 is a fragmentary sectional view taken as indicated on line 6—6 of FIGURE 5 showing the screw threadably received within the bushing.

The usual tripod for supporting a camera is provided with three legs secured together at the upper end and supporting a head with a plate upon which the camera is seated. In the illustration of the present invention the camera supporting plate of the tripod is the only part involved and therefore the balance of the tripod has not been illustrated. In FIGURE 1, a central column 9 of the tripod supports a head 10 on which there is pivotally mounted a camera supporting plate 11 swingably through approximately 90° about a pin 12 which serves also to attach the plate 11 to the head 10 of the tripod. The swinging of the plate 11 allows the user of the camera to tilt the camera in its position relative to the ground and to the tripod. It is to be understood that the usual controls for manipulating the camera universally relative to the ground are not shown as they form no part of the invention. The camera supporting plate 11 is illustrated in detail and in the present embodiment carries the camera attaching screw devices forming a part of the present invention.

The base plate 11 of the tripod may be removed from the tripod structure by removing the pin or keeper member 12 which is provided with an enlarged knurled head 18 for manipulation. The pin 12 is threaded into an upstanding standard 17, has a bearing in standard 14 spaced therefrom and passes through an apertured boss 15 depending from the base plate. Other forms of base plates may be substituted as desired, the present invention being illustrated in a structure with the camera attaching screws being carried directly by the base plate.

The tripod base plate 11 has on its upper portion a pad of rubber or the like providing a non-skid top surface 19 against which the camera 20 is tightly secured when the locking device is operated. A camera securing screw is generally located centrally of the plate 11 and is entirely supported in a bushing 21 threadably supported by the base plate in a threaded bore 22. The bushing has an external bushing thread 23 threadably received by the base plate bore 22 and an internal threaded bore 24 threadably receiving the camera attaching screw 25. The camera attaching screw has the conventional grooved or knurled head 26 for ease of manual rotation and is of such a length that it extends through the base plate 11, the rubber pad and engages a complementary threaded bore 27 in the bottom of the camera 20 as shown in FIGURE 4. The bushing 21 has a manual operating lever 28 which is pressed onto and thereby attached to a serrated section 29 of the bushing.

The bushing external thread is of steeper pitch than that of the camera attaching screw 25. The threads are chosen so that turning of the bushing will move the camera attaching screw toward the base plate whether the camera screw 25 turns with the bushing, remains tight in the camera so that it remains stationary, or any combination of moving partially with the bushing and partially remaining stationary.

In operation the bushing lever is moved counterclockwise to a position such as shown by the full lines in FIGURE 3. In this position the lever is capable of movement toward the dotted line position without hitting the tripod head 10. The camera screw 25 is then moved until its upper end is flush with the top surface 19 of the rubber pad. The camera is placed on the plate and the screw 25 is then threaded into the complementary bore 27 within the camera 20 sufficiently to engage at least a full thread. The lever may now be moved clockwise pulling the camera toward the base plate until the camera 20 is tightly secured against the non-skid top surface 19 on base plate 11.

The camera 20 is drawn toward the base plate 11 when the lever 28 is moved clockwise because the external bushing thread is of opposite hand and of greater pitch than the thread on the camera screw 25. A relatively coarse left hand external thread and a relatively fine internal right hand thread have been found to work very well in practical operation. During the tightening movement of the bushing lever 28, it makes no difference whether the thumb screw 25 rotates relative to the camera or not since the screw 25 is moved bodily toward the base plate in either instance. The pitch of the external thread supporting the bushing 23 is greater than the pitch of the thumb screw 25, causing the camera to be secured in relation to the base plate whenever the lever is moved to draw the thumb screw toward the base plate.

The foregoing detailed description is given for clearness of understanding only and no unnecessary limitations should be understood therefrom, for some modifications will be obvious to those skilled in the art.

I claim:

1. A device for tightly securing a camera to a supporting base plate, comprising: a manually actuated screw extending through a base plate and having threads for engaging a complementary threaded bore in a camera, said screw having a length to permit manual securing of the camera against the base plate, a bushing about the screw having internal threads threadably receiving said screw and an external thread threadably supporting said bushing in said base plate, said bushing comprising the sole support for said screw in said plate, said bushing external thread being of opposite hand and of greater pitch than said internal thread in said bushing for drawing the screw and camera toward said base plate when the bushing is turned in relation to said base plate, and means for manually turning said bushing relative to said base plate.

2. A device for tightly securing a camera to a camera tripod supporting base plate, comprising: a manually actuated screw extending through a base plate and having threads for engaging a complementary threaded bore in a camera, said screw having a length to permit manual securing of the camera against the base plate, a bushing about the screw having internal threads threadably receiving said screw, and an external thread threadably supporting said bushing in said base plate, said bushing comprising the sole support for said screw in said plate, said bushing external thread being of opposite hand and of greater pitch than said internal thread in said bushing for drawing the screw and camera toward said base plate when the bushing is turned in relation to said base plate and means for manually turning said bushing relative to said base plate.

3. A device for tightly securing a camera to a camera tripod supporting base plate, comprising: a manually actuated screw extending through a base plate and having threads for engaging a complementary threaded bore in a camera, said screw having a length to permit manual securing of the camera against the base plate, a bushing about the screw having internal threads threadably receiving said screw, an external thread supporting said bushing in said base plate, said bushing comprising the sole support for said screw in said plate, said external thread on said bushing having a left hand thread and said internal thread in said bushing having a right hand thread threadably receiving said screw and a lever attached to said bushing for drawing the screw and camera toward said base plate when turned in relation to said base plate to hold the camera tightly against the base plate.

4. A device for tightly securing a camera to a camera tripod supporting base plate, comprising: a manually actuated screw extending through a base plate and having threads for engaging a complementary threaded bore in a camera, said screw having a length to permit manual securing of the camera against the base plate, a bushing about the screw having internal threads threadably receiving said screw, an external thread supporting said bushing in said base plate, said bushing comprising the sole support for said screw in said plate, said external thread on said bushing having a coarse left hand thread and said internal thread in said bushing having a fine internal right hand thread and a lever attached to said bushing for drawing the screw and camera toward said base plate when turned in relation to said base plate to hold the camera tightly against the base plate.

5. A device for tightly securing a camera to a supporting base plate, comprising: a manually actuated screw extending through a base plate and having threads for engaging a complementary threaded bore in a camera against the base plate, a bushing about the screw having internal threads threadably receiving said screw and an external thread threadably supporting said bushing in said base plate, said bushing comprising the sole support for said screw in said plate, said external thread on said bushing and said external thread on said camera securing screw being of different pitches and of different hand to permit said bushing to move said screw bodily longitudinally thereof relative to said base plate when said screw does not turn relative to said base plate during turning of said bushing and means for manually turning said bushing relative to said base plate.

References Cited in the file of this patent

UNITED STATES PATENTS

| | | |
|---|---|---|
| 470,238 | Goodman | Mar. 8, 1892 |
| 857,526 | Knopf | June 18, 1907 |
| 1,138,574 | King | May 4, 1915 |
| 2,130,262 | Burlin | Sept. 13, 1938 |